Patented Apr. 28, 1931                                                      1,802,860

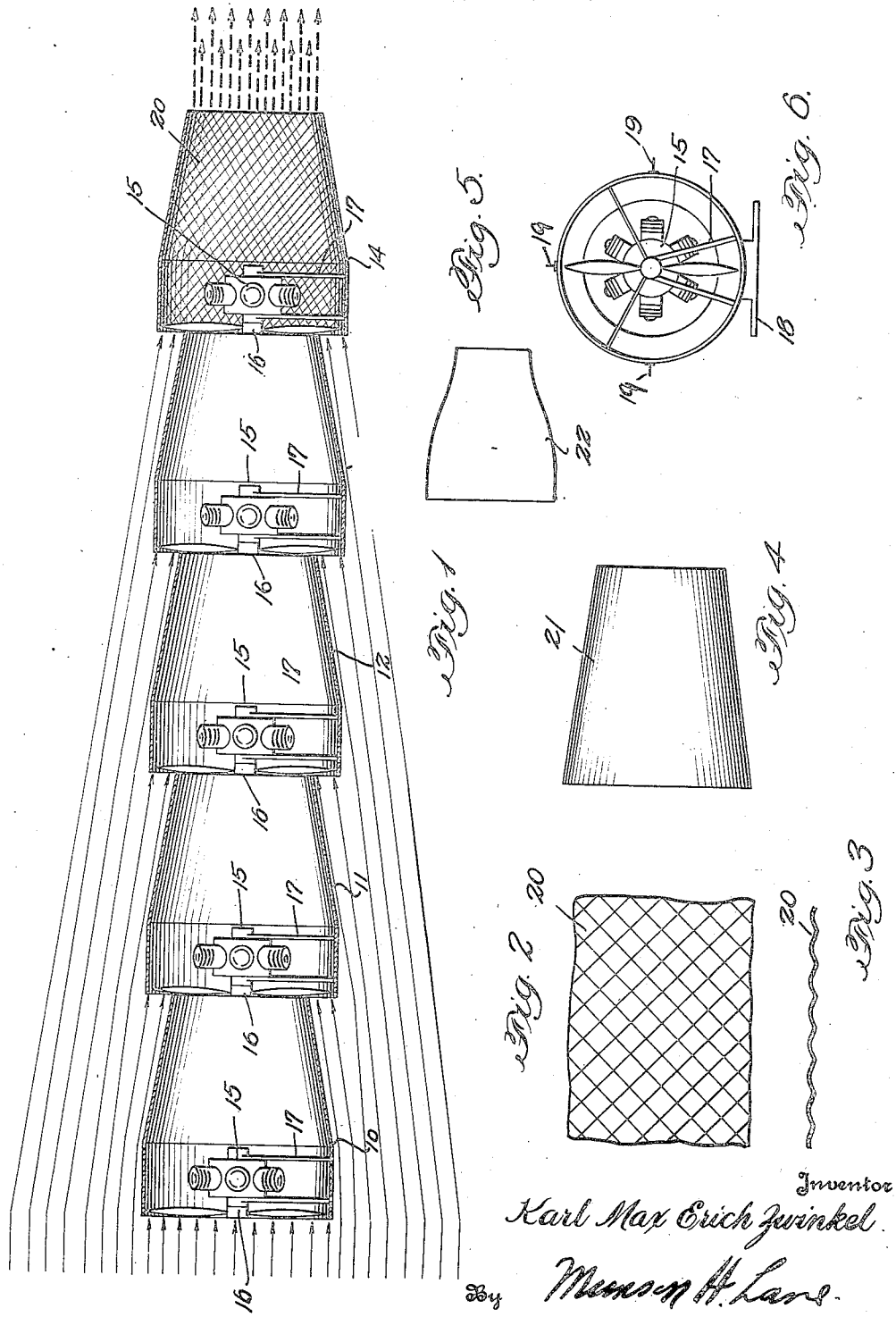

UNITED STATES PATENT OFFICE

KARL MAX ERICH ZWINKEL, OF HOBOKEN, NEW JERSEY, ASSIGNOR TO TUBULAR AIRCRAFT CORPORATION, A CORPORATION OF NEW JERSEY

MECHANICAL ROCKET POWER FOR AIRPLANES

Application filed April 6, 1929. Serial No. 353,013.

The invention relates to what I term "a mechanical rocket power", designed primarily for the propulsion of airplanes. This device may be mounted in an airplane in a manner similar to that shown in my Patent No. 1,703,916, dated March 5, 1929.

The object of the invention is to increase the effective power of motors employed for driving airplane propellers and thereby increase the possible speed of the airplane.

According to the present invention, the above object is attained by the use of two or more cone shaped tubes arranged end to end along their horizontal axes. Within each of these tubes a motor and propeller is mounted, the motor being mounted at the larger end of each of the tubes. The motors are arranged to increase in speed from the first, or intake cone member to the last cone member, so that the air discharged from the last cone member is flowing at a terrific rate. I also propose to increase the effective action of the propellers by forming a resistance surface on the interior of each of the cones. Preferably this resistance surface is in the form of what I term "fish scales".

The invention will be more readily understood by reference to the accompanying drawing, in which:

Fig. 1 is a longitudinal sectional view showing the improved rocket power composed of a plurality of cone members;

Fig. 2 is a detailed view showing the arrangement of the "fish scales" on the interior of the cones;

Fig. 3 is a detailed section on an enlarged scale showing the "fish scales";

Fig. 4 is a perspective view showing a modified form of cone member;

Fig. 5 is a sectional view showing a still further modification of the cone member, and Fig. 6 is an end view of one of the cones shown in Fig. 1. and disclosing the mounting of the motor and propeller, and the means for attaching the cones to the body of the airplane.

Referring first to Figs. 1 and 6, the reference numerals 10, 11, 12, 13 and 14 denote a plurality of cone shaped members arranged end to end along a horizontal axis. Within each of said members a motor 15—15 etc., is mounted. Each motor drives a propeller 16—16 etc., the speed of the propellers increasing consecutively from left to right, as shown in the drawing. A suitable framework 17—17 etc., is provided within the cones for mounting the motors. The cones themselves are attached to the body of the airplane by means of a longitudinal frame member 18 (Fig. 6), and longitudinal members 19.

Preferably each of the cone members is provided with suitable resistance elements, 20, which I term "fish scales", the form of which is shown in Figs. 2 and 3. These "fish scales" are constructed after the form of actual fish scales, which form I have found by actual tests materially increases the propulsive power. It will be noted that the "fish scales" are rounded, as shown in Fig. 3, so as to form a substantially smooth or streamline surface, and in plan section, as shown in Fig. 2, they are substantially diamond shape. These "fish scales" are applicable in many relations involving the rapid flow of fluid.

Obviously, the form of the cone may be varied from that shown in Fig. 1, although this is the preferred form, for the reason that it facilitates the mounting of the motors and propellers. In Fig. 4 a complete cone 21 is shown not having the cylindrical portion disclosed in Fig. 1. In Fig. 5 a cone 22 is shown which is curved lengthwise.

In operation, air is drawn into the first cone 10 (Fig. 1) from the left, and as it passes through the same, its velocity is increased until it reaches the second propeller revolving at a greater speed. This propeller advances the air at still higher rate and draws additional air around the edges of the first cone. This action is continued until the air is finally discharged from the last cone at the right at a terrific rate. Obviously the resistance effect obtained by the "fish scales" 20 materially increases the efficiency of the device.

I have found that the operation of my device is similar to that in which a plurality of explosive rockets are employed as the propulsive force for an airplane. My device possesses the important advantage over the explosive rockets in that it is continuously operating and is much less expensive.

The mechanical rocket power is preferably mounted centrally and longitudinally relative to the body of the airplane, as shown in Fig. 6, the longitudinal frame member 18 representing the lower portion of the airplane and the members 19 showing the supports at the sides and top. The body of the airplane may be of any conventional type, and it is not thought necessary to illustrate such body, but it may be of the type shown in my Patent No. 1,703,916 referred to above.

Certain of the features of the invention are applicable in other relations than for the propulsion of airplanes; for example, the system of a plurality of rocket power units may be employed in the propulsion of a boat. Likewise, if such units are stationarily mounted, they can be employed for producing a blowing effect at the discharge end or a suction effect at the intake end. I do not limit the invention to the use of a specific number of such units, as any number above two will embody the principle of the invention. Further, while the use of the "fish scales" is particularly effective in connection with my proposed arrangement of rocket power units, nevertheless these "fish scales" are capable of separate application.

The particular embodiment of the invention may be varied in detail without departing from its spirit.

Preferably alternate propellers 16 are rotated in opposite directions by their respective motors.

I claim:

1. A mechanical rocket power for airplanes comprising a plurality of cone shaped members arranged end to end along a horizontal axis, and a plurality of propellers, one mounted in each cone member, and means for operating said propellers at progressively increasing speeds from the intake end to the discharge end.

2. An airplane having a rocket power propulsive device arranged centrally and longitudinally relative to the body of the airplane and comprising a plurality of cone shaped rocket power propulsive units arranged end to end along a horizontal axis, and means for producing progressively increasing compression within said units from the intake end to the discharge end.

3. An airplane having a rocket power propulsive device arranged centrally and longitudinally relative to the body of the airplane and comprising a plurality of cone shaped rocket power propulsive units arranged end to end along a horizontal axis, means for producing progressively increasing compression within said units from the intake end to the discharge end, and resistance elements located at the interior surface of each of said rocket power units.

4. A mechanical rocket power unit for an airplane comprising a cone shaped member, a motor and propeller both mounted within the cone, and resistance elements resembling fish scales on the interior surface of said cone.

5. A fish scale resistance surface for mechanical rocket power units for propelling airplanes, comprising a plurality of smooth raised elements substantially diamond shaped in cross section at their bases and smoothly rounded in elevation, such elements resembling the scales of a fish in appearance and effect.

6. A mechanical rocket power for propelling airplanes comprising a plurality of similar rocket power units arranged end to end, each unit comprising a cone shaped member, the consecutive members discharging one into the other, and means for producing continuously increasing compressions within the successive units.

7. In an airplane, a longitudinal tube comprising a plurality of independent, like, replaceable, conical elements arranged end to end, and a plurality of motors and propellers, one motor and one propeller being mounted in each of said conical elements.

8. In an airplane, a central longitudinal tube, open at each end and at intermediate intervals along its length, comprising a plurality of conical elements arranged end to end, and having an air space at the junction of said conical elements, and propellers mounted one within each of said conical elements, and adapted to draw air from the end and intermediate intakes of said longitudinal tube, and to force said air rearwardly through the discharge end.

9. In an airplane, a longitudinal tube comprising a plurality of conical elements arranged end to end, and means for producing progressively increasing compression from one end of the tube to the other, comprising a plurality of propellers, one located within each of the conical elements, said propellers being driven at progressively increasing rates from the intake to the discharge end of the tube.

10. In an airplane, a longitudinal tube, open at each end and at intermediate intervals along its length, and propellers mounted at intervals along said tube, adapted to draw air from said end and intermediate intakes, and to force said air rearwardly through the discharge end, said tube comprising a plurality of like replaceable and independent ring members arranged end to end, one propeller and a motor for driving the same being mounted within each ring member.

In testimony whereof I affix my signature.

KARL MAX ERICH ZWINKEL.